May 7, 1929.  J. MILLS, JR  1,711,899
AIR BRAKE
Filed March 23, 1927  2 Sheets-Sheet 1
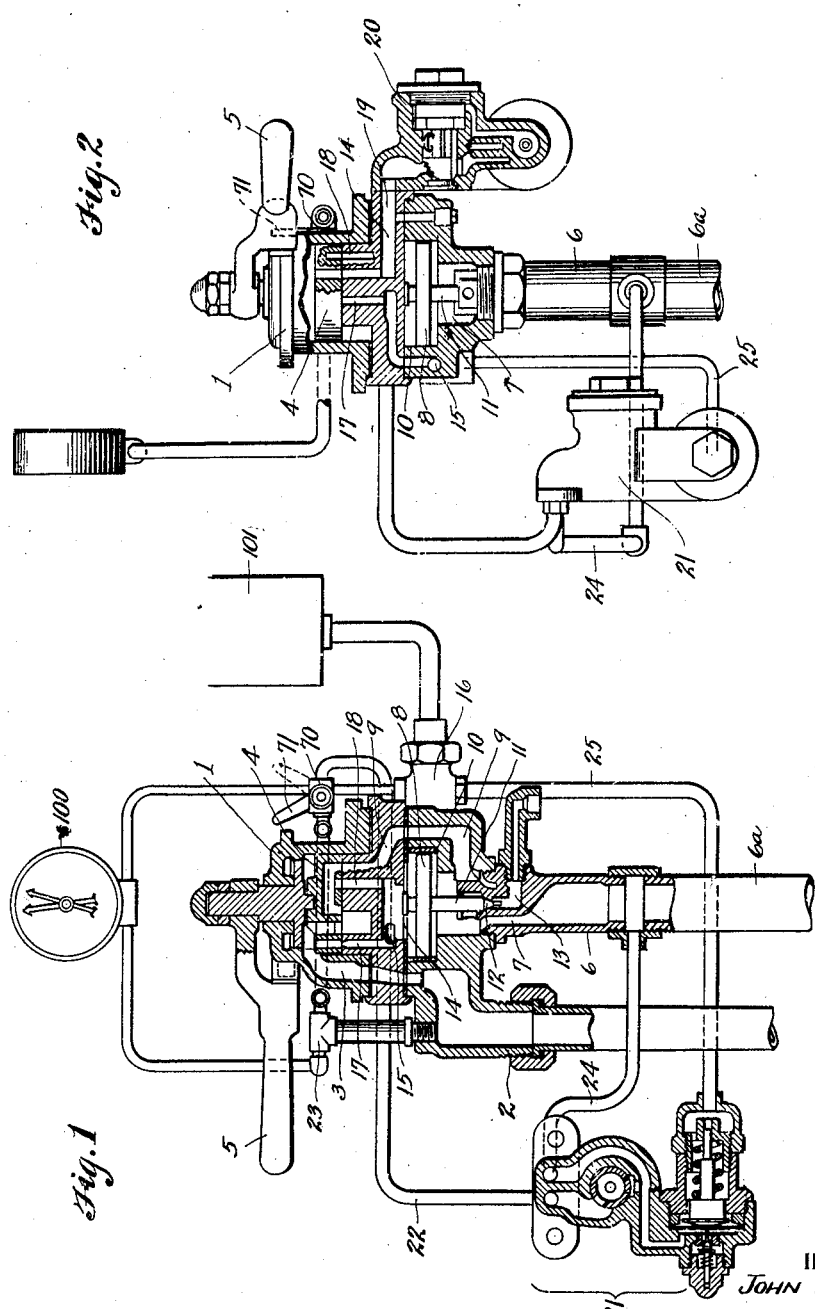
INVENTOR
JOHN MILLS JR.
BY
Richard J. Cook
ATTORNEY May 7, 1929.                J. MILLS, JR                1,711,899
                              AIR BRAKE
                         Filed March 23, 1927          2 Sheets-Sheet 2
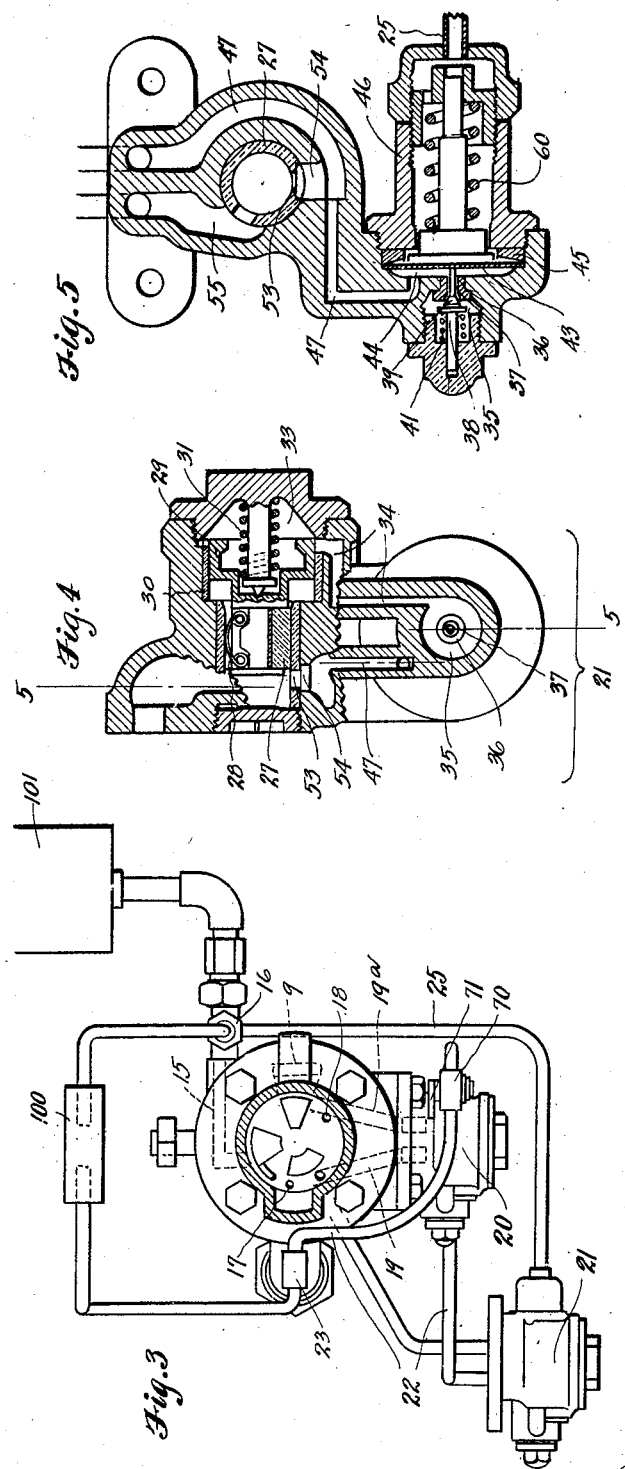
INVENTOR
JOHN MILLS JR.
BY
Richard Hook
ATTORNEY Patented May 7, 1929.

1,711,899

UNITED STATES PATENT OFFICE.

JOHN MILLS, JR., OF AUBURN, WASHINGTON.

AIR BRAKE.

Application filed March 23, 1927. Serial No. 177,674.

This invention relates to improvements in air brakes such as are used on railway rolling stock; more particularly, the invention relates to certain improvements in what is commonly known as the Westinghouse engineer's brake valve, used in connection with the automatic air braking system.

Explanatory to the invention, it will be here stated that the air braking system for which the present invention is intended comprises as its principal parts: a brake cylinder which applies the air pressure to the braking rigging, an auxiliary reservoir wherein the air pressure is stored, a pressure retaining valve, a train pipe for conveying the air to charge the auxiliary reservoir and cause the release of the brakes as applied, a triple valve, an air pump, a main reservoir into which the pump discharges and an engineer's brake valve having openings returning to the main reservoir, the train pipe and to atmosphere.

The engineer's valve is manipulated by means of a hand lever that is adjustable to various positions, namely: release position, running position, lap position, service application position and emergency application position. By its manipulation, the main reservoir pressure may be allowed to flow into the train pipe to cause the triple valve to open ports that permit the auxiliary reservoir to charge and any air in the brake cylinder to pass to the retaining valve from which it escapes freely to atmosphere when the retaining feature of the valve is cut out.

Certain difficulties sometimes arise in the use of such equipment, due to leakage of air from the train line on account of defective connections. For instance, the brakes are applied by adjustment of the brake valve lever to service application position which causes a reduction of the train line pressure and incidentally causes the triple valve to operate to admit air from the auxiliary reservoir into the brake cylinder to apply a braking pressure equal to the amount of the reduction. To hold the brake applied, the hand lever is then moved to lap position at which the brake valve neither feeds into nor discharges from the train pipe. Since lap position stops all feed into the train pipe, it follows that any leakage from the same will then reduce its pressure, thereby automatically increasing the brake application already made. Then, the only way to correct this condition is for the engineer to release all the brakes and to recharge, or to stop. This is not desirable as the releasing and recharging and applying causes a jerky, uneven running of the train which is dangerous to the train equipment and destructive to the load being carried.

In view of the above undesirable features, it has been the principal object of this invention to provide an improved means whereby air may be automatically supplied to the train line to take care of any leakage while the train is running with the brake lever in lap position, thus making it possible for the engineer to make and retain any desired reduction of the pressure in the train line.

More specifically stated, the object of the invention resides in the provision of means that operates under the control of air pressure in the equalizing chamber and reservoir to feed air from the main reservoir into the train line to compensate for any leakage from the latter while the brake valve lever is in lap position; this means being distinguished from that mechanism already provided in the engineer's valve for feeding air into the train line while the brake lever is in running position.

Another object of the invention is to provide means for automatically cutting off the connections with the present attachment by movement of the brake lever to emergency position.

In accomplishing the objects of the invention, I have provided the improved details of construction, the preferred forms of which are illustrated in the accompanying drawings, wherein—

Figure 1 is a sectional view of an engineer's brake valve and the attachment embodied in the present invention; the section being taken through the main reservoir and train pipe connections of the engineer's valve and centrally through the attachment valve.

Figure 2 is a view of the engineer's brake valve, showing parts thereof in section taken in a plane that is substantially at a right angle to the showing of the valve as in Figure 1.

Figure 3 is a plan view of the present device, showing the engineer's valve partly in horizontal section.

Figure 4 is an enlarged sectional view of the automatic feed valve of the present attachment.

Figure 5 is a sectional view substantially on the line 5—5 in Figure 4.

Since the present invention is in the nature of an attachment to the engineer's brake valve and does not, in any way, effect its mode of operation or construction, the engineer's valve will only be described in so far as is thought necessary to clearly disclose the purpose and operation of the combination covered by this invention; it being understood that the construction and operation of the engineer's valve is well understood to those familiar with the art.

Referring more in detail to the drawings—

1 designates, in its entirety, a brake valve of that type with which the present invention is embodied. This valve has a connection 2 whereby air from a main supply reservoir (not shown) may be supplied through a channel 3 to the top of a rotary valve 4 adapted to be manipulated by connection with a handle, or lever, 5. Another connection 6 is provided at the base of the valve for connection with the train pipe. This latter connection leads upwardly through a passage 7 to the underside of an equalizing piston 8 and also through a passageway 9 to the seat on which the rotary valve 4 operates. The equalizing piston operates in a cylindrical chamber 10 provided therefor and has a downwardly extended guide stem 11 fixed thereto provided with a tapered seat 12 at its lower end that acts as a valve for opening and closing a passageway 13 leading from the passage 7, by which train pipe pressure may be discharged to atmosphere. Above the equalizing piston 8 is a chamber 14 having connection, through a channel 15, with a pipe fitting 16 whereby connection is made with a pressure gauge 100 and with an equalizing reservoir 101, which is used simply to add effective volume to the chamber 14 above the equalizing piston.

Leading upwardly from chamber 14 above the equalizing piston to the under face of the rotary valve 4, is a preliminary exhaust port 17 and an equalizing port 18. Leading from the valve seat at the under side of the rotary valve and then laterally to the side of the valve body, is a channel 19 that delivers air pressure to a slide valve feed valve mechanism designated, in its entirety, at 20, which operates to automatically regulate the train pipe pressure while the brake valve handle is in running position only. After air pressure has passed through this valve mechanism 20, it is carried back to the train pipe channel 9 through a connecting channel 19ª.

A braking application is made by shifting the lever 5 to service application position at which the rotary valve 4 permits a desired reduction of pressure in the chamber 14 above the piston 8. When this reduction is reached the valve handle is returned to lap position. Reducing the pressure above the piston causes the piston to rise and this permits train pipe pressure to discharge to atmosphere through the passageway 13. When this discharge has reduced the train line pressure a trifle below the pressure remaining above the piston, the latter starts down and closes. The reduction of train line pressure causes the triple valve to operate to admit air from the auxiliary reservoir into the brake cylinder to apply a braking pressure equal to the amount of the reduction.

When the brake valve lever 5 is in lap position, the valve 4 closes all ports and thus cuts off all communication between the main reservoir and other brake valve connections, and no means is provided for feeding air into the train line to compensate for loss due to faulty connections.

In order to compensate for any leakage in the train line 25 which will cause a further reduction of the pressure while the valve lever is in lap position, I have provided the feed valve embodied by this invention. This, in the drawings, is designated in its entirety by reference numeral 21. This valve device acts automatically to feed air from the main supply reservoir into the train line. It is connected by means of a pipe 22 with a fitting 23 which is threaded into the passage 3 in the valve 1. Another pipe 24 leads from the valve into the train pipe connection designated at 6ª. The operation of the valve mechanism 21 is under the control of air pressure delivered thereto from the chamber 14 in valve 1 through a pipe 25 that connects with the fitting 16.

The valve 21 consists of a slidable supply valve 27 having a spring 28 and operated by a piston 29 that is seated in its cylinder 30 without packing so as to permit leakage past it when pressure is higher on one side than on the other. A coiled spring 31 bears against the outside of the piston to urge it inwardly and it is moved outwardly against the spring pressure by air delivered against the inner side through the connection with the main reservoir. From a chamber 33 at the outside of the piston, is a channel 34 that leads into a circular cavity 35 provided centrally with a bush 36 having a port 37 through it governed by a regulating valve 38 consisting of a stem with a tapered shoulder 39 adapted to a seat in the port 37, with a spring 41 urging the shoulder against the seat and an end portion of the stem that continues beyond the shoulder against a flexible diaphragm 43 which overlies a chamber 44 and is held seated by a ring 45 and the inner end of a cap 46 that is threaded into the chamber tightly against the periphery of the diaphragm in an air-tight connection.

The chamber 44 is in constant communication with the train pipe pressure through a port 47 with which the pipe 24 connects. The purpose of the regulating valve 38 is to open or close the connection between the chamber 33 and the train pipe; it is opened by the diaphragm 43 and, when the latter permits, is closed by a spring 41. The train pipe pressure in chamber 44 is opposed by air pressure from above the equalizing piston 8 in the valve 1 that is delivered into the cap 46 through the connecting pipe 25 which leads from the fitting 16 into the end of the cap. A coiled spring 60 is also contained in the cap 46 and this bears against the diaphragm with just sufficient pressure to overcome frictional loss, and it may be adjusted to any desired tension; in the present equipment, it is adjusted to exert a pressure of about ten (10) pounds.

When the slide valve 27 is at its inner position, its inner end covers a connecting port 53 between a channel 54 that leads into the channel 47 to the chamber 44 and a channel 55 that connects with the pipe 22 previously referred to, that connects this valve with the main reservoir.

Assuming that the automatic valve mechanism, designated at 21, in connection with the engineer's valve is adjusted to maintain seventy (70) pounds pressure in the train line when the valve lever is in running position, it is apparent that under ordinary conditions the pressure in the chamber 14 above the equalizing piston also would be seventy (70) pounds. Now, assuming that the engineer has made an application of ten (10) pounds braking pressure by reducing the pressure in the chamber 14 ten (10) pounds, and has incidentally caused a reduction of ten (10) pounds in the train line, and has then shifted the brake lever to lap position at which all ports are closed, if perfect conditions were possible the braking pressure would be held indefinitely.

With the present device air pressure in the chamber 14, which after this reduction is sixty pounds, is communicated through the passage 15, fitting 16 and pipe 25 into the cap 46 to press inwardly on the diaphragm 43. Train line pressure is communicated through the pipe 24, port 47 into the chamber 44 at the other side of the diaphragm, and main reservoir air is delivered through the pipe 22, channel 55, past the piston 29 thru the channel 34 into the chamber 35 and is held by the valve 39.

Now, assuming that, due to defective pipe connections or for other reasons, air leaks from the train pipe; this reduces pressure in the chamber 44 and allows the pressure in the cap 46 from chamber 14 to press the diaphragm inwardly to open the valve 39 and to thereby admit pressure from the main supply into the train line to build this up before action of the triple valve causes any farther application of the brakes. As soon as this pressure is built up the valve 39 closes and cuts off the air from the supply.

In order that main reservoir pressure may not be fed into the train line when the engineer's brake valve lever is in emergency position, I have provided a valve 70 in the pipe 22 with an actuating lever 71 disposed in such position that it will be engaged by the lever 5 when the latter is moved to emergency position and will be moved so as to close the valve 70.

I claim:

In an air brake system of the character described, the combination with the engineer's brake valve of a feed valve mechanism having air connection with the main supply reservoir, with the train line and with the equalizing chamber of the engineer's valve, and operable automatically incidental to any reduction of air pressure in the train line while the engineer's valve is in lap position, to deliver air into the train line from the main supply to maintain a pressure in the train line equal to that of the equalizing chamber and means for closing off air connection to the feed valve by movement of the engineer's valve lever to emergency position.

Signed at Seattle, Washington, this 10th day of September, 1926.

JOHN MILLS, Jr.